(12) United States Patent
Uchida et al.

(10) Patent No.: US 7,455,869 B2
(45) Date of Patent: *Nov. 25, 2008

(54) COMPOSITION FOR PREPARING ARTIFICIAL FRUIT FLESH AND FOOD PRODUCT CONTAINING THE SAME

(75) Inventors: Kazuro Uchida, Toyonaka (JP); Iwao Asai, Toyonaka (JP)

(73) Assignee: San-Ei Gen F.F.I., Inc., Toyonaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/322,574

(22) Filed: Dec. 19, 2002

(65) Prior Publication Data

US 2004/0121061 A1 Jun. 24, 2004

(51) Int. Cl.
*A23L 1/0524* (2006.01)
(52) U.S. Cl. ..................................... 426/577
(58) Field of Classification Search ................. 426/573, 426/577
See application file for complete search history.

(56) References Cited

U.S. PATENT DOCUMENTS

| | | | | |
|---|---|---|---|---|
| 3,892,870 | A * | 7/1975 | Wood | 426/573 |
| 4,089,981 | A * | 5/1978 | Richardson | 426/104 |
| 4,119,739 | A * | 10/1978 | Barwick et al. | 426/573 |
| 5,538,751 | A * | 7/1996 | Carter et al. | 426/661 |
| 5,562,939 | A * | 10/1996 | Lewis | 426/250 |
| 5,576,039 | A * | 11/1996 | Lewis | 426/250 |
| 6,165,534 | A * | 12/2000 | Luzio et al. | 426/573 |
| 6,485,771 | B1 * | 11/2002 | Somerville et al. | 426/573 |

FOREIGN PATENT DOCUMENTS

| | | |
|---|---|---|
| EP | 0 487 340 A1 | 5/1992 |
| EP | 0 656 176 A1 | 6/1995 |
| EP | 0 752 211 A1 | 1/1997 |
| JP | 3-277259 | 12/1991 |
| JP | 7-196707 | 8/1995 |
| JP | 8-256705 | 10/1996 |
| SU | 504534 | 5/1976 |
| WO | WO 9937685 A1 * | 7/1999 |

OTHER PUBLICATIONS

Wiley Encyclopedia of Food Science and Technology (2nd Edition) vols. 1-4. Copyright 1999. John Wiley & Sons . pp. 1224 and 1217. Retrieved from Online Knovel database Oct. 25, 2004. URL<http://www.knovel.com/knovel2/Toc.jsp?SpaceID=155&BookID=681>.*
Handbook of Hydrocolloids. Copyright 2000,Woodhead Publishing, pp. 87-102. Retrieved from online Knovel database Oct. 25, 2004. URL<http://www.knovel.com/knovel2/Toc.jsp?BookID=168>.*
Jackson Gastroenterology. "Dysphagia Diet 5 Levels Difficulty in Swallowing Diet". Copyright 1998, pp. 12-12. Retrieved from Internet Oct. 25, 2004. URL<http://web.archive.org/web/20000824035602/http://www.gicare.com/pated/edtgs07.htm>.*
U.S. Appl. No. 10/297,608, filed Dec. 13, 2002.

* cited by examiner

*Primary Examiner*—Arthur L Corbin
(74) *Attorney, Agent, or Firm*—Kratz, Quintos & Hanson, LLP

(57) ABSTRACT

The present invention provides novel compositions having an eating texture similar to that of a natural fruit flesh, an artificial fruit flesh having an eating texture similar to that of natural fruit flesh prepared by using the compositions, and a food product containing artificial fruit flesh. The aforementioned compositions are the gel-containing liquid composition containing a pectin with a degree of esterification of 20% or less, a divalent metal ion and water, and the heterogeneous gel composition containing a negatively-charged gelling agent in addition to the above-mentioned ingredients.

19 Claims, No Drawings

COMPOSITION FOR PREPARING ARTIFICIAL FRUIT FLESH AND FOOD PRODUCT CONTAINING THE SAME

TECHNICAL FIELD

The present invention relates to novel compositions that can provide an eating texture similar to that of a natural fruit flesh (a real fruit flesh). The invention also relates to a food product comprising the above compositions, specifically, a food product that consists entirely or partly of an artificial fruit flesh prepared by using the above compositions, which has an eating texture similar to that of a natural fruit flesh.

BACKGROUND OF THE INVENTION

Jelly, which has a soft and elastic texture specific to gel, is widely used as dessert due to its pleasant and smooth glossal sensation when held in the mouth. Heretofore, various types of jelly prepared by using substances that have gel-forming ability, such as agar, gelatin and the like, have been commercially available. Among them, the consumption of jellies with an eating texture similar to that of a natural fruit flesh has been increasing because they allow consumers to inexpensively and readily enjoy the flavor and the eating texture of fruit.

As described above, jelly is popularly accepted as a dessert among consumers, and their consumptions are on the rise. However, most jellies are simply prepared by gelating a gelling agent solution seasoned with flavor such as aroma and taste similar to that of a natural fruit flesh, by treatment such as cooling or the like. Consequently, many of them differ in an eating texture from that of a natural fruit flesh.

Various research efforts have been conducted to develop a food product having an eating texture (dental and glossal sensations) similar to that of a natural fruit flesh by using food additives such as the gelling agent. However, no satisfactory results are yet achieved.

DISCLOSURE OF THE INVENTION

An object of the present invention is to provide compositions that can exhibit an eating texture similar to that of a natural fruit flesh. Another object of the invention is to provide a food product, particularly, a food product for a dessert, that consist entirely or partly of artificial fruit flesh having an eating texture similar to that of a natural fruit flesh.

The inventors conducted research for the above objectives and found the following. When an LM pectin with a degree of esterification of 20% or less is mixed with a divalent metal ion in the presence of water, the pectin reacts with the divalent metal ion, and agglomerates locally to form lumpy and relatively firm gel-like substances (hereinafter sometimes referred to as "pectin-derived agglomerated gel"), and thereby a liquid composition (hereinafter sometimes referred to as a "gel-containing liquid composition") is obtained wherein the gel-like substances are unevenly distributed or dispersed. The gel-containing liquid composition exhibits an eating texture as if it contains pieces of natural fruit flesh or fruit fiber, due to its lumpy (rough) glossal sensation of the pectin-derived agglomerated gel containing therein. By adjusting degree of esterification of the pectin and concentrations of the pectin and the divalent metal ion, the size and the firmness (elasticity) of the resulting pectin-derived agglomerated gel can be controlled, and thereby an artificial fruit flesh with a fibrous feeling imitated that of a desired natural fruit will be provided.

The inventors conducted further research based on the above findings to discover that the use of a negatively-charged gelling agent in addition to the aforementioned ingredients is more effective. Specifically, when an LM pectin and an gelling agent are mixed with a divalent metal ion in the presence of water, a network-like gel structure phase (hereinafter sometimes referred to as a "gelling agent-derived gel") is formed by the reaction between the gelling agent and the divalent metal ion in addition to the above "pectin-derived agglomerated gel" formed by the reaction between the pectin and the divalent metal ion, and thereby a gel composition (hereinafter sometimes referred to as a "heterogeneous gel composition") is obtained wherein particles of the "pectin-derived agglomerated gel" are unevenly dispersed in the gel structure phase (gelling agent-derived gel). The inventors also found that the heterogeneous gel composition exhibits an eating texture (dental and glossal sensations) highly similar to that of a natural fruit flesh, in other word an eating texture as if it is a natural fruit flesh, due to its pleasant firmness and elasticity of the gel structure phrase (gelling agent-derived gel) and its lumpiness (roughness) of the "pectin-derived agglomerated gel" contained therein. Furthermore, the inventors found that fruit flesh of a desired fruit can be imitated by selecting degree of esterification of the pectin, type and combination of the gelling agent, and concentrations of the pectin, gelling agent and divalent metal ion, The present invention was accomplished based on the above findings and contains the following embodiments:

(1) Gel-Containing Liquid Composition (1-1) A gel-containing liquid composition comprising a pectin with a degree of esterification of 20% or less, a divalent metal ion and water.

The gel-containing liquid composition is a liquid composition wherein the "pectin-derived agglomerated gel" formed by the reaction between the pectin and the divalent metal ion is unevenly distributed (dispersed) in water. The term "liquid" herein used implies fluidity. For example, a composition of which shape is altered by its own weight at 4° C. is categorized into the liquid composition in the present invention.

Pectins are generally classified into high methoxyl pectin (HM pectin) of which degree of esterification is 50% or more and low methoxyl pectin (LM pectin) of which degree of esterification is 50% or less. The Pectin usable in the present invention is LM pectin.

(1-2) The gel-containing liquid composition according to Item (1-1), wherein the pectin has a solubility of less than 1 wt. % in water with a hardness of 45 mg/L at 80° C.

(1-3) The gel-containing liquid composition according to Item (1-1) or (1-2), wherein the pectin has a degree of esterification of 15% or less.

(1-4) The gel-containing liquid composition according to any of Items (1-1) to (1-3), containing at least one member selected from a calcium ion and a magnesium ion as a divalent metal ion.

(1-5) The gel-containing liquid composition according to any of Items (1-1) to (1-4), containing at least 0.03 wt. % of the pectin.

(1-6) The gel-containing liquid composition according to any of Items (1-1) to (1-5), containing 0.1 to 40 mM of the divalent metal ion.

(1-7) The gel-containing liquid composition according to any of Items (1-1) to (1-6), which is prepared by reacting the pectin with the divalent metal ion or a divalent metal ion-containing substance in an aqueous solution.

(1-8) The gel-containing liquid composition according to any of Items (1-1) to (1-6), which is prepared using a method comprising a step of adding to and dissolving in a pectin-containing aqueous solution the divalent metal ion or a divalent metal ion-containing substance in solid or solution form, or of adding to and dissolving in a divalent metal ion-containing aqueous solution the pectin in solid or solution form.

(1-9) The gel-containing liquid composition according to any of Items (1-1) to (1-6), which is prepared using a method comprising a step of adding to and dissolving in a pectin-dissolved aqueous solution the divalent metal ion or a divalent metal ion-containing substance in solid or solution form the pectin in solution form.

(2) Heterogeneous Gel Composition (2-1) A heterogeneous gel composition comprising a pectin with a degree of esterification of 20% or less, a divalent metal ion, a negatively-charged gelling agent and water.

A reaction between the pectin and the divalent metal ion and a reaction between the gelling agent and the divalent metal ion occur separately in the heterogeneous gel composition. The heterogeneous gel composition is a solid composition wherein the "pectin-derived agglomerated gel" formed by the former reaction (the reaction between the pectin and the divalent metal ion) is unevenly dispersed in the gel structure phase ("gelling agent-derived gel") formed by the latter reaction (the reaction between the gelling agent and the divalent metal ion).

(2-2) The heterogeneous gel composition according to Item (2-1), wherein pectin has a solubility of less than 1 wt. % in water with a hardness of 45 mg/L at 80° C.

(2-3) The heterogeneous gel composition according to Item (2-1) or (2-2), wherein the pectin has a degree of esterification of 15% or less.

(2-4) The heterogeneous gel composition according to any of Items (2-1) to (2-3), containing at least one member selected from a calcium ion and a magnesium ion as a divalent metal ion.

(2-5) The heterogeneous gel composition according to any of Items (2-1) to (2-4), wherein the negatively-charged gelling agent is heat resistant.

(2-6) The heterogeneous gel composition according to any of Items (2-1) to (2-5), wherein the negatively-charged gelling agent is at least one member selected from gellan gum, alginic acid, alginate, alginic ester, carrageenan and pectin.

(2-7) The heterogeneous gel composition according to any of Items (2-1) to (2-6), containing at least 0.03 wt. % of the pectin.

(2-8) The heterogeneous gel composition according to any of Items (2-1) to (2-7), containing 0.1 to 40 mM of the divalent metal ion.

(2-9) The heterogeneous gel composition according to any of Items (2-1) to (2-8), containing 0.005 to 5 wt. % of the negatively-charged gelling agent.

(2-10) The heterogeneous gel composition according to any of Items (2-1) to (2-9), further containing at least one member selected from xanthan gum, glucomannan and galactomannan.

(2-11) The heterogeneous gel composition according to any of Items (2-1) to (2-10), further containing at least one member of protein and acid.

(2-12) The heterogeneous gel composition according to Item (2-11), containing 0.1 to 10 wt. % of the protein.

(2-13) The heterogeneous gel composition according to Item (2-11) or (2-12), which is prepared to have a pH value of 2.5 to 5 by the adding the acid.

(2-14) The heterogeneous gel composition according to any of Items (2-1) to (2-13), which is prepared using method comprising a step of dissolving in water a powdery mixture of the pectin, the gelling agent, and, as required, a divalent metal ion-containing substance in powder form; adding to and dissolving in the resulting solution the divalent metal ion or a divalent metal ion-containing substance in solid or solution form; and solidifying the mixed solution.

(2-15) The heterogeneous gel composition according to any of Items (2-1) to (2-13), which is prepared using method comprising a step of dissolving in water a powdery mixture of the pectin, the gelling agent, and, as required, a divalent metal ion-containing substance in powder form; adding to and dissolving in the resulting solution the divalent metal ion or a divalent metal ion-containing substance in solution form; and solidifying the mixed solution.

(3) Methods for Preparing the Compositions of the Invention (3-1) A method for preparing the gel-containing liquid composition defined in any of Items (1-1) to (1-6) by reacting the pectin with the divalent metal ion or a divalent metal ion-containing substance in an aqueous solution.

(3-2) A method for preparing the gel-containing liquid composition defined in any of Items (1-1) to (1-6), comprising a step of adding to and dissolving in a pectin-containing aqueous solution the divalent metal ion or a divalent metal ion-containing substance in solid or solution form, or adding to and dissolving in a divalent metal ion-containing aqueous solution the pectin in solid or solution form.

(3-3) A method for preparing the gel-containing liquid composition defined in any of Items (1-1) to (1-6), in which the divalent metal ion or a divalent metal ion-containing substance in solution form is added to and dissolved in a pectin-containing aqueous solution.

(3-4) A method for preparing the heterogeneous gel composition defined in any of Items (2-1) to (2-13), comprising a step of dissolving in water a powdery mixture of the pectin, the gelling agent, and as required a divalent metal ion-containing substance in powder form; adding to and dissolving in the resulting solution the divalent metal ion or a divalent metal ion-containing substance in solid or solution form; and solidifying the mixed solution.

(3-5) A method for preparing the heterogeneous gel composition defined in any of Items (2-1) to (2-13), comprising a step of dissolving in water a powdery mixture of the pectin, the gelling agent, and as required a divalent metal ion-containing substance in powder form; adding to and dissolving in the resulting solution the divalent metal ion or a divalent metal ion-containing substance in solution form; and solidifying the mixed solution.

(4) Food Product (4-1) A food product consisting entirely or partly of the gel-containing liquid composition defined in any of Items (1-1) to (1-7).

(4-2) The food product according to Item (4-1), which is used for an artificial fruit flesh-containing sauce, artificial fruit flesh-containing jam, artificial fruit flesh-containing dressing, artificial fruit flesh-containing topping, or artificial fruit flesh-containing beverage.

(4-3) A food product consisting entirely or partly of the heterogeneous gel composition defined in any of Items (2-1) to (2-14).

(4-4) The food product according to Item (4-3), which is used as artificial fruit flesh.

(4-5) The food product according to Item (4-3), which is a confection or a beverage containing the heterogeneous gel composition defined in any of Items (2-1) to (2-14) as an artificial fruit flesh.

(4-6) The food product according to Item (4-5), wherein the confection is jelly.

(4-7) The food product according to any of Items (4-1) to (4-6), which is used for food for a dysphagia patient.

BEST MODE FOR CARRYING OUT THE INVENTION (1) Gel-Containing Liquid Composition Firstly, the present invention provides a gel-containing liquid composition prepared by using as ingredients a pectin, a divalent metal ion and water.

The liquid composition is characterized by that the pectin and the divalent metal ion react in the presence of the water, locally agglomerate and gelate, and the resulting gel is dispersed as lumps in the aqueous solution thereby forming an heterogeneous phase.

The pectin usable herein is LM pectin with a degree of esterification of 20% or less. The "degree of esterification" of pectin indicates the degree of esterification of pectinic acid; it is usually determined by the amount of methoxyl contained, i.e., the number of esterified carboxyl groups (FAO/WHO standard). Preferable is pectin with a degree of esterification of about 18% or less, more preferably about 15% or less. The lowest value of the degree of esterification is not limited. It is usually about 2%, preferably about 5%.

The pectin usable in the present invention exhibit insolubility in water containing a calcium (e.g., tap water, which contains small amount of calcium). Specifically, when the pectin usable herein is added to tap water with a hardness of 45 mg/L at 80° C. in a concentration of 1 wt. %, the pectin does not dissolve in the tap water and insoluble matter is visually observed. With an electron microscope of 600 magnification, for example, insoluble particles with a mean diameter of about 25 μm can be observed for pectin with a degree of esterification of 15%, and insoluble particles with a mean diameter of about 50 μm can be observed for pectin with a degree of esterification of 5%. In contrast, pectin with a degree of esterification of 25% or more, particularly 30% or more, dissolve in the aforementioned tap water.

Here, the hardness of water implies the amount of calcium and magnesium ions in water converted to the amount of calcium carbonate by the following equation:

Hardness of water (CaCO$_3$(mg/L))=(Mg(mg/L)×4.118)+(Ca(mg/L)×2.497)

(cf. "Water Supply Examination (1993)" edited by the Water Supply and Environment Department, Environmental Health Bureau, Ministry of Health and Welfare, Japan)

The hardness of water can be measured by the EDTA method employing chelate reaction with ethylenediaminetetraacetic acid (EDTA). By this method, water with a hardness of 45 mg/L can also be prepared.

The pectin usable in the present inventionwith the characteristics described above can be prepared by controlling the degree of esterification (esterification control) so that the final pectin may have a degree of esterification within the above range (20% or less, preferably 18% or less) in a conventional pectin production process. Usually, pectin is prepared by using fruits that are rich in pectic substances (for example, the rind of citrus fruits, and squeezed apple) as starting materials through the following processes ("Stabilizers and Their Applications" Society of Sanitary Engineering, 1989, pp. 152-155).

(1) Solubilization of protopectin

A process for solubilizing pectic substances. It is usually conducted by using oxygen and acid.

(2) Extraction of pectin

A process for extracting pectin from plant tissues. It is usually conducted by acid hydrolysis.

(3) Esterification control

The esterification of pectin is controlled by the following three methods:

(a) Acid hydrolysis: acid treatment conducted at a low temperature for a long period of time.

(b) Alkaline hydrolysis: deesterification conducted under the conditions of pH 10.5 to 11 and 10 to 20° C.

(c) Enzymatic treatment: deesterification conducted by applying pectase to pectin under the conditions of pH 6 to 6.5 and 30 to 45° C.

(4) Precipitation and purification of pectin

A process for precipitating pectin of which degree of esterification is controlled with the alcohol or the metallic salt (for example, aluminum salts). The precipitated pectin is then dried and granulated, and its gelling ability is normalized by a small amount of dextrin or sugar. For the pectin precipitated with the metallic salt, it is washed with the alcohol to remove metal ions after drying and granulation.

The pectin thus prepared is in entirely or partly dried form, or in dried powder form, and is then used for the preparation of the gel-containing liquid composition of the present invention. The pectin usable in the preparation of the gel composition of the invention is preferably in dried powder form with for usability, and more preferably dried powder with a water content of 12% or less. These pectins are obtained by selecting commercially available pectins according to the degree of esterification. The degree of esterification of pectin can be calculated according to the FAO/WHO standard.

The pectin content in the gel-containing liquid composition of the invention is not limited. The pectin content of the final liquid composition is preferably 0.03 wt. % or more, more preferably 0.06 wt. % or more, most preferably 0.2 wt. % or more. Insofar as it is in the range described above, its upper limit is not specified but usually set at 7 wt. %. Preferably, the pectin content is selected from the range of 0.03 to 1 wt. %.

The divalent metal ion usable in the invention is exemplified by an alkaline earth metal ion such as calcium ion, magnesium ion or the like. Preferable is a calcium ion.

The calcium ion can be provided from water-soluble calcium salts such as calcium lactate, calcium chloride, tricalcium phosphate, calcium monohydrogen phosphate, calcium dihydrogen phosphate, calcium gluconate, calcium carbonate, calcium citrate, calcium hydroxide, calcium pantothenate, calcium dihydrogen pyrophosphateand calcium sulfate and the loke. It can also be provided from animal and vegetable milks such as cow milk and soy bean milk as well as dairy products thereof (hereinafter referred to as a "divalent metal ion-containing substance")

The content of the divalent metal ion in the gel-containing liquid composition of the invention is not limited insofar as the agglomeration and gelation occur by reaction with pectin. Usually, 0.1 to 40 mM of the divalent metal ion is preferably contained in the final liquid composition. For example, when a calcium ion-containing substance such as a calcium salt is used as a divalent metal ion-containing substance, the content of this substance in the final liquid composition preferably ranges from 0.005 to 0.15 wt. %, particularly when calcium lactate as the substance is used at ranges from 0.06 to 0.7 wt. %.

The gel-containing liquid composition of the invention can be prepared by reacting the pectin and the divalent metal ion in an aqueous solution. Examples of the method for reacting the pectin and the divalent metal ion in an aqueous solution are:

A: simultaneously mixing the pectin and the divalent metal ion both in liquid form;
B: simultaneously adding the pectin and the divalent metal ion both in powder form to water;
C: adding the divalent metal ion in solution or solid form (as the divalent metal ion-containing substance) to a pectin-containing aqueous solution (pectic aqueous solution); and
D: adding a pectic aqueous solution or the pectin in solid form to an aqueous solution containing the divalent metal ion (a divalent metal ion-containing aqueous solution).

Preferrable is the method wherein a divalent metal ion-containing aqueous solution (e.g., a calcium salt such as calcium lactate dissolved in water preferably at about 75 to 90° C.) is added to and mixed with a pectic aqueous solution prepared by dissolving a pectin in water. Methods for dissolving the pectin in water include mixing and stirring the pectin and water at room temperature for the pectin that is soluble to room temperature water. It is, however, preferable to stir them for about 5 to 15 minutes under heating at about 75 to 90° C.

When the divalent metal ion-containing aqueous solution such as cow milk and fresh cream is used as a divalent metal ion-containing substance, the gel-containing liquid composition of the invention can be prepared, although is not limited thereto, by adding solid pectin to the aqueous solution, heating the mixture to dissolve pectin followed by cooling the mixture. On the other hand, when a divalent metallic salt such as calcium lactate is used as a divalent metal ion-containing substance, it is preferable to add the divalent metallic salt to a pectic aqueous solution previously prepared by dissolving pectin in water under heating, and then the mixture is stirred to dissolve the divalent metallic salt (under heating, as required) followed by cooling it, thereby enabling the gel-containing liquid composition of the invention to be prepared.

In the gel-containing liquid composition thus obtained, lumps of the gel-like substance (agglomerated gel) formed from the pectin and the divalent metal ion are distributed or dispersed in the aqueous solution. The lumpiness (roughness), firmness and elasticity of the agglomerated gel enable imitating the fibrous feel of a natural fruit flesh in terms of eating texture (dental and glossal sensations).

The gel-like substance (agglomerated gel) in the gel-containing liquid composition of the invention is characterized by its heat resistance. Preferably it does not fuse at 120° C. This property can be evaluated by visually observing a gel-containing liquid composition, which is gelated by adding a small amount of aqueous solution containing calcium lactate (the final content: 0.2 wt. %) to 1 wt. % of the pectin dissolved in ion-exchange water and is gradually heated to 90° C. within about 10 minutes. When a gel-like substance is visually observed in the gel-containing liquid composition, it is evaluated as a heat resistant substance.

By adding the desired colorant and flavoring to the gel-containing liquid composition of the invention, a liquid food product can be prepared that have a flavor and an eating texture as if it contains a natural fruit flesh, i.e, pieces of fruit flesh or fruit fiber (fruit flesh-like eating texture).

Specifically, the gel-containing liquid composition of the invention can be prepared as a food product having the aforementioned fruit flesh-like eating texture, particularly as topping compositions for food such as sweet sauce, or jelly-like beverage (drinkable jelly), etc., by blending as required the dairy product such as cow milk and fresh cream with water, adding thereto a powdery mixture of pectin, sugar, etc., stirring the mixture for about 5 to 15 minutes under heating at about 75 to 90° C. to dissolve the ingredients, further adding the divalent metal ion (for example, a calcium salt such as calcium lactate dissolved in water) followed by adding and dissolving the flavor adjuster such as acid and fruit juice together with the flavoring, the colorant and the like.

As described above, when solid matter such as skim milk powder is used as a divalent metal ion-containing substance, it is preferable to previously dissolve a powdery mixture containing pectin, sugar, etc., in water under heating, and then add the divalent metal ion-containing substance to the pectic aqueous solution.

(2) Heterogeneous Gel Composition

Secondly, the present invention provides a heterogeneous gel composition prepared by using the negatively-charged gelling agent in addition to the aforementioned ingredients, i.e., the pectin with a degree of esterification of 20% or less, the divalent metal ion and water.

The gel composition is characterized by that it is composed of a heterogeneous phase wherein the gel (pectin-derived agglomerated gel) formed from the divalent metal ion and the pectin is dispersed in the network-like gel structure phase (gelling agent-derived gel) formed from the divalent metal ion and the gelling agent.

The gelling agent usable herein is not limited insofar as it is edible and negatively charged. Specific examples are gellan gum; alginic acid, alginates such as sodium alginate, alginic esters such as alginic acid propylene glycol ester, carrageenan (ι-carrageenan and κ-carrageenan) and pectin (LM pectin with a degree of esterification of more than 20%). These can be used alone or in a suitable combination of two or more substances.

To modify the gel characteristics, xanthan gum, mannans (galactomannan such as locust bean gum, tara gum, guar gum and the like, and glucomannan such as konjac powder), etc., can be used in combination in addition to the gelling agent described above. For example, when gellan gum and carrageenan are used in combination as negatively-charged gelling agents, the elasticity of the gelling agent-derived gel can be augmented by employing the aforementioned mannans. Particularly, it is preferable to use mannans in combination with gellan gum and/or carrageenan.

Preferable gelling agents are those having heat resistance. Examples are gellan gum, alginic acid and LM pectin with a degree of esterification more than 20%. Particularly preferable is gellan gum. Gellan gum is not only useful for the preparation of fruit flesh-like juicy gel compositions but also has high affinity to pectin, particularly an excellent binding ability with water-swelled pectin. Therefore, when gellan gum is used as a gelling agent, the heterogeneous gel composition of the invention has a structure in which the gel-like substance (pectin-derived agglomerated gel) formed from the pectin and the divalent metal ion is tightly bonded with the gel structure phase (gelling agent-derived gel) formed from the gelling agent and the divalent metal ion. Thus, the gel composition does not separate unnaturally when held in the mouth and exhibits an even more pleasant eating texture (fruit flesh-like eating texture) exactly similar to that of a natural fruit flesh.

The content of the gelling agent in the heterogeneous gel composition of the invention varies according to the type of the gelling agent and the intended use of the gel composition (the type of fruit to be imitated), and cannot generally be specified. However, it is usually selected from the range of 0.005 to 5 wt. %, preferably 0.01 to 3 wt. % of the final gel composition. As a specific example, when gellan gum is used as a gelling agent, its content is usually selected from the range of 0.06 to 1.2 wt. %, preferably 0.12 to 0.6 wt. %, more preferably 0.18 to 0.45 wt. % of the final gel composition. When carrageenan is used, its content is usually selected from the range of 0.02 to 0.4 wt. %, preferably 0.04 to 0.2 wt. %, more preferably 0.06 to 0.15 wt. % of the final gel composition. When glucomannan is used in combination with the gelling agent, its content is selected from the range of 0.02 to 0.4 wt. %, preferably 0.04 to 0.2 wt. %, more preferably 0.06 to 0.15 wt. % of the final gel composition.

The heterogeneous gel composition of the invention may further contain at least one member of a protein and an acid in addition to the pectin, the divalent metal ion, the gelling agent and water described above. The protein reacts with both the pectin and the gelling agent. Hence, the use thereof allows controlling the elasticities both of pectin-derived agglomerated gel formed from the pectin and the divalent metal ion and of the gelling agent-derived gel formed from the gelling agent and the divalent metal ion to the desired degrees. Moreover, the use thereof further reinforces the binding between the pectin-derived agglomerated gel and the gelling agent-derived gel and thereby promotes their integration.

The protein usable in the invention is not limited insofar as it is edible. Examples are animal protein such as milk protein (e.g. fresh cream and cow milk), egg protein, meat and fish protein; and vegetable proteins such as wheat protein and soybean protein.

The content of protein varies according to the type of the gelling agent and the intended use of the heterogeneous gel composition (the type of fruit to be imitated), and cannot generally be specified. However, it is usually selected from the range of 0.1 to 10 wt. % of the final gel composition.

The acid usable in the invention is not limited insofar as it is edible. Examples are organic acids such as citric acid, lactic acid, malic acid, succinic acid, tartaric acid, adipic acid, acetic acid, glacial acetic acid, fumaric acid, glucono-delta-lactone, gluconic acid butyric acid, and the like; and inorganic acids such as phosphoric acid, carbonic acid and hydrochloric acid. The fruit juice-derived acid and fruit juice itself are also usable.

The acid is useful as an adjustor allowing the heterogeneous gel composition of the invention to exhibit an eating texture exactly similar to that of a natural fruit flesh, and is added for savory effects such as improving flavor.

The content of acid is not limited. However, it is usually selected so that the pH value of the final gel composition of the invention rages from about 2.5 to 5, preferably about 3.2 to 4.2.

The heterogeneous gel composition of the invention is the gel-containing liquid composition solidified by adding the gelling agent thereto and cooling the mixture wherein the particles of the pectin-derived agglomerated gel are unevenly dispersed. Therefore, the method for preparing the heterogeneous gel composition composes of the steps for preparing the gel-containing liquid composition and steps of adding the gelling agent to the liquid composition and of solidifying the mixed composition.

The gelling agent is preferably blended with pectin in the form of powdery mixture and used together with pectin. The step of solidifying the mixed composition is usually conducted after mixing all the ingredients, adjusting the total weight, and filling the mixture into a vessel. Cooling down to ambient temperature (25° C.) or water-cooled temperature (8° C.) allows the mixture to solidify in a few hours.

By adding the desired colorant and flavoring, a food product having an appearance, an eating texture (dental and glossal sensations) and a flavor that are similar to those of a natural fruit flesh can be prepared. Specifically, the heterogeneous gel composition of the invention can be prepared by blending as required the dairy product such as cow milk and fresh cream with water; adding thereto a powdery mixture of pectin, the gelling agent, sugar, etc., stirring the mixture for about 5 to 15 minutes under heating at about 75 to 90° C. to dissolve the ingredients; further adding the divalent metal ion (for example, a calcium salt such as calcium lactate dissolved in water); adding and dissolving, as required, flavor adjustor such as acid, fruit juice or the like, protein, flavoring, colorant and the like; adjusting the total weight; filling the mixture into a vessel; and cooling the content in vessel. When solid matter such as calcium lactate and skim milk powder is used as a divalent metal ion-containing substance, it is preferable to previously dissolve a mixture containing the pectin, the gelling agent, sugar, etc., in water under heating, and then add the divalent metal ion-containing substance to this solution containing the pectin and the gelling agent.

In the heterogeneous gel composition thus obtained, the gel agglomerates (pectin-derived agglomerated gel) formed from the pectin and the divalent metal ions are unevenly dispersed in the form of lumps in, and are bound to the gel structure phase (gelling agent-derived gel) formed from the gelling agent and the divalent metal ions, and solidified. The heterogeneous gel composition can exhibit an eating texture (glossal and dental sensations) highly similar to that of a natural fruit flesh due to the elasticity of the gel composed of the gelling agent-derived gel and the pectin-derived agglomerated gel, as well as due to the lumpiness (roughness) of the pectin-derived agglomerated gel unevenly dispersed in the gelling agent-derived gel. Its cut surface also possesses an appearance highly similar to that of natural fruit flesh tissue.

Therefore, the heterogeneous gel composition of the invention can be applied to food products with an eating texture quite similar to a natural fruit flesh, particularly for artificial fruit flesh itself. By adding into a jelly the heterogeneous gel composition of the invention in place of a natural fruit flesh, a dessert containing the artificial fruit flesh can be provided.

(3) Food Product

Finally, the present invention provides a food product composed of the gel-containing liquid composition or the heterogeneous gel composition, and a food product containing both of these compositions. Their examples are food products consisting entirely or partly of the gel-containing liquid composition or the heterogeneous gel composition of the invention as artificial fruit flesh such as confections (e.g. jelly, yogurt, bavaroise, syrup-pickled fruit, pudding and the like) and fillings (e.g. jam, marmalade, flour pastes and the like). Food product of the invention also include confections and fillings containing natural fruits (natural fruit flesh) in the aforementioned compositions.

Specific examples of these food products are as follows:

1. Artificial Fruit Flesh

This is imitation fruit having an eating texture (glossal and dental sensations) and an appearance (cut surface) similar to those of the flesh of natural fruits such as melon, apples pear, citrus fruits(e.g. orange), strawberry, watermelon, peach, grape, kiwi fruit, mango and chestnut. Since the artificial fruit flesh of the invention retains its initial state (appearance, eating texture) after heat sterilization due to the heat resistance of its gel structure, and it is preservable for a long time and commercially practical.

2. Jelly Containing Artificial Fruit Flesh

This is jelly containing in its jelly portion the artificial fruit flesh with which entire or part of natural fruit flesh is replaced. The jelly portion can be prepared to be acidic or neutral. The jelly containing the artificial fruit flesh can be readily prepared by a conventional production method of jelly, i.e., filling the heterogeneous gel composition of the invention and the jelly portion, into a vessel followed by cooling. Since the gel structure of the artificial fruit flesh consisted of the heterogeneous gel composition is heat resistant, this jelly can be heat sterilized without changing the gel structure of the artificial fruit flesh and without fusion the artificial fruit flesh portion and jelly portion. Therefore, it is preservable for a long time, and can be provided as retort-packed instant jelly premix containing artificial fruit flesh.

3. Food for Dysphagia Patients, or Drinkable Jelly

The gel-containing liquid composition and the heterogeneous gel composition of the invention (both, in this case, preferably prepared to have a low gel strength) can be provided as jelly drinkable with or without a straw.

4. Jam-like Food, Fruit Sauce, Fruit Dressing, Spread (Flour Paste and Fruit Spread), Filling, Topping and Sheet-like Food The gel-containing liquid composition and the heterogeneous gel composition of the invention (both, in this case, preferably prepared in sol form by further lowering the gel strength) can be provided as jam, sauce and spread. These food products can be used as sandwich spread and toppings of pizza or pie, and filling for the sweet bun, such as the cream bun. Furthermore, when making muffins or the like, sauce containing one or both of these compositions, can be kneaded into the dough. These products can also be provided in a mayonnaise tube or the like.

5. Applications for Surimi-Based or Paste Food Products Such as Kamaboko (Pureed, Steamed Fish), Ham, Sausage, and Hamburger The heterogeneous gel composition of the invention has heat resistance and maintains its shape even when being heated, and is therefore effective for retaining the shape of these food products while providing thereto a specific eating texture.

6. Use as Coating Agents

The gel-containing liquid composition or the heterogeneous gel composition of the invention can be used as a coating agent for various food products. Thereby, food products, especially confections and desserts, can be provided with a coating having an artificial fruit flesh eating texture. For example, when an ice confection is coated with either of the compositions, the ice confection acquires an eating texture similar to that of a natural fruit flesh.

7. Applications for Viscous Beverages, Such as Nectars and Smoothies

The gel-containing liquid composition and the heterogeneous gel composition of the invention (both, in this case, preferably prepared in sol form) can be provided as viscous beverages, particularly those viscous beverages having an eating texture similar to that of a natural fruit flesh.

8. Pouch-Packed Jelly

It has heretofore not been possible to incorporate large solid matter such as fruit flesh and the like into a pouch-packed jelly because-, in production, the liquid jelly has to be inserted into the pouch through an opening. Also, if the entire jelly content were an artificial fruit flesh, the jelly could not be packed in a pouch. However, according to the present invention, regardless of the size of the opening of the container (flexible pouch, bottle, etc.), the entire content of the container can be prepared as artificial fruit flesh, or confections (jellies) containing, as a part of the content in the container, artificial fruit flesh (small pieces) having a size larger than that of the opening of the container can be prepared. Thereby, the present invention can provide food products (jellies, artificial fruit flesh, jellies containing artificial fruit flesh, etc.) that can be eaten in a new way. For example, by preparing the heterogeneous gel composition of the invention packed in a standing pouch (rectangular, longitudinal, stick-type pouch), a new type of food product can be provided that can be eaten without dirtying the hands or using utensils, such as a fork, by directly biting off a portion gradually squeezed out of the pouch.

EXAMPLES

The present invention is described in more detail with reference to the following experimental examples, examples, and comparative examples. However the scope of the present invention is not limited by these examples. The ingredients indicated by asterisks "*" in the following formulations are products of San-Ei Gen F.F.I., Inc.

Experimental Example 1

(1) Solubility of Pectin in Water

Solubilities in water were investigated for five kinds of low-methoxyl pectins (LM pectins) with various degrees of esterification (DE) of 5 to 46% (see Table 1). Specifically, 1 g of each LM pectin was added to 100 ml of water with a hardness of 45 mg/L and heated to 80° C. The solubility was evaluated by visually observing the aqueous solutions thus obtained. The solubility of the pectin in water with a hardness of 45 mg/L at a temperature of 80° C. was evaluated as follows;

"◯ ($\geqq$1 wt. %)": when insoluble matter was not observed in the aqueous solutions obtained above and the aqueous solution was clear "X (<1 wt. %)": when insoluble matter was observed in the aqueous solution or the aqueous solution is not clear The results are shown in Table 1.

(2) Reactivity of Pectin with a Divalent Metallic Salt

Reactivity with a divalent metallic salt was investigated for the five kinds of low-methoxyl pectins (LM pectins) with various degrees of esterification (DE) of 5 to 46% shown in Table 1. Specifically, 1 g of each LM pectin was added to about 90 ml of ion-exchange water and dissolved by heated to 80° C., and the resulting solution was cooled to 25° C. An aqueous solution containing calcium lactate as a divalent metallic salt was blended therewith so that the final concentration might be 0.1 wt. %. Ion-exchange water was further added to adjust the total amount to be 100 ml. The mixture thus prepared was then observed. The results are also shown in Table 1.

TABLE 1

| | Pectin | | States of aqueous solution (aqueous solution mixture) containing 1 wt. % of pectin and 0.1 wt. % of calcium lactate |
|---|---|---|---|
| No. | DE | Solubility in water | |
| 1 | 5% | X (<1 wt. %) | Formation of firm gel particles with a relatively large particle sizes dispersed unevenly in the aqueous solution. |

TABLE 1-continued

| No. | Pectin DE | Solubility in water | States of aqueous solution (aqueous solution mixture) containing 1 wt. % of pectin and 0.1 wt. % of calcium lactate |
|---|---|---|---|
| 2 | 15% | X (<1 wt. %) | Formation of firm gel particles with a relatively large particle sizes dispersed unevenly in the aqueous solution. |
| 3 | 25% | ○ (≧1 wt. %) | Formation of gel particles unevenly dispersed in the aqueous solution. However the gel was soft and the particle size was small. |
| 4 | 34% | ○ (≧1 wt. %) | Formation of gel particles unevenly dispersed in the aqueous solution. However the gel was soft and the particle size was small. |
| 5 | 46% | ○ (≧1 wt. %) | Although formation of a tiny amount of gel particles was observed, the gel was extremely soft. |

No. 1: GENU Pectin LM-5CS (manufactured by CP Kelco ApS)
No. 2: SLENDID type 100 (manufactured by CP Kelco ApS)
No. 3: GENU Pectin LM-104ASYA (manufactured by CP Kelco ApS)
No. 4: GENU Pectin LM-102AS (manufactured by CP Kelco ApS)
No. 5: GENU Pectin LM-105AS (manufactured by CP Kelco ApS)

As shown in Table 1, gel particles were formed and unevenly dispersed in the aqueous solution mixtures prepared by using of the pectin (Nos. 1 or 2) of which a DE is less than 25% and solubilities are less than 1 wt. % in water with a hardness of 45 mg/L at 80° C. When they were examined under a microscope, the gel particles formed from No. 1 and No. 2 pectins had the mean particle diameter of about 50 μm and about 25 μm, respectively.

On the other hand, although gel particles were observed in the aqueous solution mixtures prepared by using the pectins (Nos. 3 to 5) with a DE of 25% or more and a solubility of less than 1 wt. % to the water with a hardness of 45 mg/L at 80° C., the gel particles were soft. This tendency becomes more pronounced as the DE increases. The gel particles formed from the pectin (No. 5) with a DE of 46% are extremely soft, and the entire aqueous solution mixture appeared to form a gel of low strength.

Experimental Example 2

Sauce Containing Artificial Strawberry Flesh

| Pectin (as shown in Table 2) | 0.6 wt. % |
|---|---|
| Sugar | 30.0 |
| Strawberry juice with five-fold concentration | 5.0 |
| Calcium lactate | 0.2 |
| Citric acid (crystals) (50% aqueous solution) | 0.3 |
| Flavoring (Trade name: Strawberry Flavor No. 59553*) | 0.2 |
| Ion-exchange water | Balance |
| Total | 100.0 wt. % |

Sweet sauces (Examples 1 and 2, and Comparative Examples 1 to 3) were prepared according to the above formulation by using various LM pectins (Degree of esterification: 5 to 46%, Nos. 1 to 5) as employed in Experimental Example 1. Specifically, a powdery mixture of sugar and pectin that had been prepared in advance was blended with ion-exchange water, and stirred for 10 minutes to dissolve by heated to 80° C. To the solution, were added strawberry juice with five-fold concentration, citric acid, calcium lactate that had been dissolved beforehand in a small amount of hot water, and a flavoring, and the mixture was further stirred to dissolve the ingredients. Ion-exchange water was added thereto to adjust the final proportion of each ingredient to be as specified above, and the mixture was cooled to room temperature (about 25° C.). The resulting mixture was poured onto yogurt as an artificial strawberry flesh-containing sauce (sauce with strawberry-like eating texture) (yogurt:sauce=90: 10 wt. %), and the eating texture thereof was evaluated by 6 monitors (3 males and 3 females). The evaluations provided by the monitors for the sweet sauces thus prepared are summarized in Table 2.

TABLE 2

| | | Degree of esterification for pectin | Evaluation of the eating texture for sweet sauces |
|---|---|---|---|
| Examples | 1 | 5% | Strawberry-like lumpiness and roughness, as if strawberry flesh were contained in the sauce |
| | 2 | 15% | Strawberry-like lumpiness and roughness, as if strawberry flesh were contained in the sauce |
| Comparative Examples | 1 | 25% | Slight roughness, entire sauce became a gel of low consistency, with an eating texture that was far from that of a sauce containing natural strawberry flesh |
| | 2 | 34% | Nearly the entire sauce became a uniform gel of low consistency, with no roughness, and an eating texture that was far from that of a sauce containing natural strawberry flesh |
| | 3 | 46% | Nearly the entire sauce became a uniform gel of low consistency, with no roughness, and an eating texture that was far from that of a sauce containing natural strawberry flesh |

Gel particles were formed and unevenly dispersed in the sweet sauces (Examples 1 and 2) prepared by using the pectins (pectin Nos. 1 and 2 in Experimental Example 1) having a DE of less than 25%. Their lumpy (rough) glossal sensation provides eating texture as if small pieces (fibers) of natural strawberry flesh were contained in the sauces. On the other hand, for the sweet sauces prepared using the pectins (pectin Nos. 3 to 5, in Experimental Example) having a DE of 25% or more, the sauces appeared to be a gel of low consistency with almost no lumpy (rough) eating texture, and their eating texture was far different from that of a sauce containing natural strawberry flesh.

Hence, the sweet sauces of Examples 1 and 2 can be provided as strawberry flavored sauces that have an eating texture exactly similar to a natural strawberry flesh (small pieces of the fruit, fruit flesh fibers). In other words, the sweet sauces can be provided as strawberry-flavored sauces containing artificial strawberry flesh (artificial strawberry flesh-containing sauces, sauces with strawberry-like eating texture). Moreover, by pouring these sauces onto yogurt as toppings, a fruit dessert (fruit yogurt) can be provided that has an eating texture as if it contains natural strawberry flesh.

Example 3

Sauce Containing Artificial Apple Flesh

| | |
|---|---|
| Pectin (Degree of esterification: 15%) | 0.8 wt. % |
| Sugar | 20.0 |
| Sucralose | 0.01 |
| Apple juice with five-fold concentration | 4.0 |
| Calcium lactate | 0.2 |
| Flavoring (Trade name: Apple Flavor No. 64525*) | 0.2 |
| Ion-exchange water | Balance |
| Total | 100.0 wt. % |

Using the above formulation, a sweet sauce was prepared. Specifically, a powdery mixture of sugar and pectin (manufactured by CP Kelco ApS) that had been prepared in advance was blended with ion-exchange water. Sucralose was further added to the mixture, and the resulting mixture was dissolved by heating and stirring for 10 minutes at 80° C. To the mixture were added apple juice with five-fold concentration, calcium lactate that had been dissolved beforehand in a small amount of hot water, and a flavoring, and the mixture was further stirred to dissolve the ingredients. Ion-exchange water was added thereto to adjust the final proportion for each ingredient to be as specified above, and the mixture was cooled to room temperature. The sweet sauce thus obtained had a non-uniform, and rough eating texture (fibrous feeling) remarkably similar to an eating texture of a grated natural apple, and was therefore useful as an artificial apple flesh-containing sauce (sauce with apple-like eating texture).

Moreover, by pouring this sauce onto yogurt as a topping, a fruit dessert (fruit yogurt) can be provided that has an eating texture as if it contained natural apple flesh (grated apple flesh).

Experimental Example 3

Preparation of Artificial Fruit Flesh (Artificial Muskmelon Flesh)

| | |
|---|---|
| Sugar | 10.00 wt. % |
| Pectin (as shown in Table 3) | 0.30 |
| Gellan gum | 0.18 |
| Calcium lactate | 0.20 |
| κ-Carrageenan | 0.10 |
| Mannan | 0.06 |
| Fresh cream | 2.00 |
| Colorant (Trade name: Melon Color L*) | 0.10 |
| Flavoring (Trade name: Melon Flavor No. 60245*) | 0.20 |
| Ion-exchange water | Balance |
| Total | 100.00 wt. % |

Artificial fruit fleshes (Examples 4 and 5, and Comparative Examples 4 to 6) were prepared according to the above formulation by using various LM pectins (Degree of esterification: 5 to 46%, Nos. 1 to 5) as employed in Experimental Example 1. Specifically, a powdery mixture of sugar, pectin, gellan gum, κ-carrageenan and mannan that had been prepared in advance was blended with a mixture of ion-exchange water and fresh cream, and the mixture was dissolved by heating and stirring for 10 minutes at 80° C. To the mixture were added a colorant, a flavoring and calcium lactate that had been dissolved beforehand in a small amount of hot water, and the mixture was further stirred to dissolve the ingredients. Ion-exchange water was added thereto to adjust the final proportion for each ingredient to be as specified above, and the mixture was charged into a vessel. The content was then cooled (10° C.) and solidified to prepare an artificial muskmelon flesh. The solidified mixture was cut into bite-size pieces like muskmelon flesh, and the appearance and eating texture thereof were evaluated by 6 monitors (3 males and 3 females). The evaluations provided by the monitors for each artificial fruit flesh thus obtained are summarized in Table 3.

TABLE 3

| | | Degree of esterification for pectin | Evaluation of the appearance and eating texture for the artificial fruit flesh |
|---|---|---|---|
| Examples | 4 | 5% | Appearance: Uneven, fruit flesh-like fibers observed that strongly resembled a melon<br>Eating texture: A fibrous feeling and rough glossal sensation specific to melon flesh; eating texture very similar to a melon; no uniform, smooth eating texture of jelly perceived |
| | 5 | 15% | Appearance: Uneven, fruit flesh-like fibers observed that strongly resembled a melon<br>Eating texture: A fibrous feeling and rough glossal sensation specific to melon flesh; eating texture very similar to a natural melon; no uniform, smooth eating texture of jelly perceived |
| Comparative Examples | 4 | 25% | Appearance: The formation of non-uniform gel structure observed, but the appearance was far different from that of melon flesh |

TABLE 3-continued

| | Degree of esterification for pectin | Evaluation of the appearance and eating texture for the artificial fruit flesh |
|---|---|---|
| 5 | 34% | Eating texture: A smooth texture specific to jelly, far different from the eating texture of melon flesh<br>Appearance: The formation of non-uniform gel structure observed, but the appearance was far different from that of melon flesh<br>Eating texture: A smooth texture specific to jelly, far different from the eating texture of melon flesh |
| 6 | 46% | Appearance: The formation of a uniform phase as observed in a conventional jelly, appearing extremely different from that of melon flesh<br>Eating texture: A smooth texture as exhibited by a conventional jelly, differing greatly from the eating texture of melon flesh |

For artificial melon fleshes (Examples 4 and 5) prepared by using pectins (pectin Nos. 1 and 2 in Experimental Example 1) having a DE of less than 25%, there were gel particles unevenly dispersed within the gel structure so that their appearance highly similar to tissue of a natural melon flesh. When eaten, the lumpy (rough) dental sensation and glossal sensation of the artificial melon fleshes were perceived as a fibrous feeling that is specific to natural melon flesh and provided an eating texture exactly similar to that of a natural melon. On the other hand, for the artificial fruit fleshes (Comparative Examples 4 to 6) prepared using pectins (pectin Nos. 3 to 5 in Experimental Example 1) having a DE of 25% or more, there was scarcely any formation of gel particles and the gel phase was generally uniform so that their appearance and eating texture were far different from those of natural melon flesh. These tendencies become more pronounced as the DE increases.

Therefore, the artificial fruit flesh of Examples 4 and 5 can be served as imitation muskmelon-like food products that have an eating texture exactly similar to that of natural melon flesh.

Example 6

Artificial Banana Flesh

| | |
|---|---|
| Sugar | 15.0 wt. % |
| Sucralose | 0.01 |
| Pectin (Degree of esterification: 20%) | 0.3 |
| Gellan gum | 0.2 |
| Puréed banana | 5.0 |
| Calcium lactate | 0.2 |
| Trisodium citrate | 0.05 |
| ι-Carrageenan | 0.1 |
| Tapioca starch | 1.5 |
| Glucomannan | 0.15 |
| Fresh cream | 5.0 |
| Citric acid | 0.2 |
| Flavoring (Trade name: Banana Flavor No. 61447*) | 0.15 |
| Colorant (Trade name: San Yellow No. 2*) | 0.02 |
| Ion-exchange water | Balance |
| Total | 100.00 wt. % |

A powdery mixture of sugar, pectin (manufactured by CP Kelco ApS), gellan gum, ι-carrageenan, glucomannan, trisodium citrate, sucralose and tapioca starch that had been prepared in advance was blended with a mixture of ion-exchange water and fresh cream, and dissolved by heating and stirring for 10 minutes at 80° C. To the mixture were added citric acid, pureed banana and calcium lactate that had been dissolved beforehand in a small amount of hot water, and the mixture was further stirred to dissolve the ingredients. A colorant and a flavoring were further blended therewith, and ion-exchange water was added to adjust the final proportion for each ingredient to be as specified above. The mixture was charged into a vessel. The content was then cooled (10° C.) and solidified to prepare an artificial banana flesh. The artificial banana flesh thus obtained exhibited a moist, rough, fibrous glossal sensations, and provided the eating texture exactly similar to that of natural banana flesh.

Example 7

Artificial Pear Flesh

| | |
|---|---|
| Sugar | 15.0 wt. % |
| Pectin (Degree of esterification: 18%) | 0.3 |
| Gellan gum | 0.3 |
| Pear juice with six-fold concentration | 2.0 |
| Calcium lactate | 0.2 |
| Trisodium citrate | 0.05 |
| κ-Carrageenan | 0.05 |
| Glucomannan | 0.05 |
| Fresh cream | 2.0 |
| Citric acid | 0.15 |
| Flavoring (Trade name: Pear Flavor No. 61932*) | 0.2 |
| Ion-exchange water | Balance |
| Total | 100.00 wt. % |

A powdery mixture of sugar, pectin, gellan gum, κ-carrageenan, glucomannan, and trisodium citrate that had been prepared in advance was blended with a mixture of ion-exchange water and fresh cream, and dissolved by heating and stirring for 10 minutes at 80° C. To the mixture were added citric acid, 6-fold concentrated pear juice, and calcium lactate that had been dissolved beforehand in a small amount of hot water, and the mixture was further stirred to dissolve the ingredients. A colorant and a flavoring were further blended therewith, and ion-exchange water was added to adjust the final proportion for each ingredient to be as specified above. The mixture was charged into a vessel. The content was then cooled (10° C.) and solidified to prepare an artificial pear flesh. The artificial pear flesh thus obtained exhibited a rough, strongly fibrous, dental and glossal sensations, and provided the eating texture exactly similar to that of a natural pear flesh.

Example 8

Artificial Apple Flesh

| | |
|---|---|
| Sugar | 15.0 wt. % |
| Pectin (Degree of esterification: 15%) | 0.3 |
| Gellan gum | 0.4 |
| Puréed apple | 5.0 |
| Clear apple juice with five-fold concentration | 2.0 |
| Calcium lactate | 0.2 |
| Trisodium citrate | 0.05 |
| κ-Carrageenan | 0.1 |
| Glucomannan | 0.1 |
| Fresh cream | 2.0 |
| Citric acid | 0.2 |
| Flavoring (Trade name: Apple Essence No. 52747*) | 0.15 |
| Colorant (Trade name: San Yellow No. 2*) | 0.02 |
| Ion-exchange water | Balance |
| Total | 100.00 wt. % |

A powdery mixture of sugar, pectin, gellan gum, κ-carrageenan, glucomannan, and trisodium citrate that had been prepared in advance was blended with a mixture of ion-exchange water and fresh cream, and dissolved by heating and stirring for 10 minutes at 80° C. To the mixture were added citric acid, pureed apple, 5-fold concentrated apple juice, and calcium lactate that had been dissolved beforehand in a small amount of hot water, and the mixture was further stirred to dissolve the ingredients. A colorant and a flavoring were further blended therewith, and ion-exchange water was added to adjust the final proportion for each ingredient to be as specified above. The mixture was charged into a vessel. The content was then cooled and solidified to prepare an artificial apple flesh. The artificial apple flesh thus obtained exhibited a rough, fibrous dental and glossal sensations and provided the eating texture exactly similar to that of a natural apple flesh.

Example 9

Artificial Watermelon Flesh

| | |
|---|---|
| Sugar | 15.0 wt. % |
| Pectin (Degree of esterification: 18%) | 0.3 |
| Gellan gum | 0.2 |
| Calcium lactate | 0.2 |
| Trisodium citrate | 0.05 |
| κ-Carrageenan | 0.1 |
| Glucomannan | 0.1 |
| Skim milk powder | 0.6 |
| Flavoring (Trade name: Watermelon Flavor No. 61043*) | 0.15 |
| Colorant (Trade name: San Red RC*) | 0.1 |
| Ion-exchange water | Balance |
| Total | 100.00 wt. % |

A powdery mixture of sugar, pectin, gellan gum, κ-carrageenan, glucomannan, trisodium citrate and skim milk powder that had been prepared in advance was blended with ion-exchange water, and dissolved by heating and stirring for 10 minutes at 80° C. To the mixture were added calcium lactate that had been dissolved beforehand in a small amount of hot water, and the mixture was further stirred to dissolve it. A colorant and a flavoring were further blended therewith, and ion-exchange water was added to adjust the final proportion for each ingredient to be as specified above. The mixture was charged into a vessel. The content was then cooled to solidified to prepare an artificial watermelon flesh. The artificial watermelon flesh thus obtained exhibited a juicy, as well as rough, fibrous, dental and glossal sensations, and provided the eating texture exactly similar to that of natural watermelon flesh.

Example 10

Artificial Chestnut Flesh

| | |
|---|---|
| Sugar | 15.0 wt. % |
| Pectin (Degree of esterification: 5%) | 0.8 |
| Gellan gum | 0.6 |
| Chestnut paste | 15.0 |
| Calcium lactate | 0.2 |
| Trisodium citrate | 0.05 |
| κ-Carrageenan | 0.2 |
| Glucomannan | 0.15 |
| Flavoring (Trade name: Chestnut Flavor No. 69*) | 0.15 |
| Colorant (Trade name: Carrot Base 160R*) | 0.02 |
| Ion-exchange water | Balance |
| Total | 100.00 wt. % |

A powdery mixture of sugar, pectin, gellan gum, κ-carrageenan, glucomannan, and trisodium citrate that had been prepared in advance was blended with ion-exchange water, and dissolved by heating and stirring for 10 minutes at 80° C. To the mixture were added chestnut paste and calcium lactate that had been dissolved beforehand in a small amount of hot water, and the mixture was further stirred to dissolve the ingredients. A colorant and a flavoring were blended therewith, and ion-exchange water was added to adjust the final proportion for each ingredient to be as specified above. The mixture was charged into a vessel. The content was then cooled and solidified to prepare an artificial chestnut flesh. The artificial chestnut flesh thus obtained exhibited a flaky, fibrous glossal sensation, and provided the eating texture exactly similar to that of sweet roasted chestnut.

Example 11

Jelly Containing Artificial Fruit

Each of Artificial fruit fleshes prepared in Examples 4 to 10 were cut into cubes 7 to 15 mm on a side. For the jelly portion, ingredients listed below were blended and then dissolved by heating for 10 minutes at 80° C., to prepare a jelly solution (pH 3.9). The cubes of an artificial fruit fleshes and the jelly solution were placed into a vessel at a weight ratio of 1:1, and heat sterilized for 20 minutes at 90° C. to obtain a jelly containing artificial fruit flesh (jelly containing artificial fruit).

Jelly Ingredients

| | |
|---|---|
| Sugar | 18.0 wt. % |
| Carrageenan | 0.4 |
| Locust bean gum | 0.2 |
| Gellan gum | 0.1 |
| Potassium chloride | 0.1 |
| Citric acid | 0.2 |
| Sodium citrate | 0.1 |
| Ion-exchange water | Balance |
| Total | 100.0 wt. % |

For comparison, fruit-containing jellies were prepared in the same manner as above except that the artificial fruit flesh of Examples 4 to 10 was replaced with natural fruit flesh. For comparison with Example 10, a sweet roasted chestnut was used for the chestnut.

The jellies prepared for comparison using natural fruit flesh encountered fruit flesh deterioration and discoloring, presumably due to heat sterilization. The jellies containing the artificial fruit flesh of the invention were free of these phenomena, and the properties thereof were not deteriorated by heat sterilization. Further, the jellies appeared pleasant and fresh, and tasted delicious.

Example 12

Artificial Fruit Flesh Contained in a Tear-Open Pouch Container

The un-solidified solutions for preparing the artificial melon flesh of Example 5, the artificial pear flesh of Example 7, and the artificial watermelon flesh of Example 9 were charged into tear-open pouch containers, heat sterilized for 20 minutes at 90° C., then cooled to obtained an artificial fruit flesh contained in tear-open pouch containers.

INDUSTRIAL APPLICABILITY

Through the use of the compositions (gel-containing liquid composition and heterogeneous gel composition) of the invention, a food product that has an appearance and an eating texture similar to those of a natural fruit flesh tissue can be provided. Particularly, the heterogeneous gel composition prepared by using the pectin and the negatively-charged gelling agent exhibits an appearance and an eating texture highly similar to those of a natural fruit flesh, rather than those of heretofore-proposed gel compositions. Therefore, the heterogeneous gel composition of the invention can provide artificial fruits flesh, and beverages and confections that have an eating texture similar to that of a natural fruit flesh. Moreover, since the compositions of the invention are heat resistant, the shape or the desired fruit flesh-like eating texture is not impaired by a heat sterilization process in their production. And since these compositions are also freezing and thawing resistant, there is little water separation caused by freezing and thawing. Therefore, regardless of the production process or the form of the product for storage, such as refrigerated or frozen, the compositions of the invention can be applied to various food products thereby giving the food products more diversity. Further, the compositions of the invention, as described above, can be heat sterilized without impairing the shape and eating texture thereof, thus making them useful as food products for long-term storage at ambient temperatures.

Furthermore, the compositions (gel-containing liquid composition and heterogeneous gel composition) are also useful as food products for a dysphagia patient when prepared with low gel strength.

The invention claimed is:

1. A heterogeneous gel composition having an eating texture similar to that of fruit flesh comprising:
   a pectin with a degree of esterification of 20% or less;
   a divalent metal ion;
   a negatively-charged gelling agent, provided that in case the negatively-charged gelling agent is a pectin, LM pectin with a degree of esterification of more than 20% is used; and
   water;
   wherein clumps of agglomerated gel formed from the pectin with a degree of esterification of 20% or less and the divalent metal ion are unevenly dispersed in and tightly bonded with a gel structure phase formed from the divalent metal ion and the gelling agent.

2. The heterogeneous gel composition according to claim 1, wherein the pectin has a solubility of less than 1 wt. % in water with a hardness of 45 mg/L at 80° C.

3. The heterogeneous gel composition according to claim 1, wherein the pectin has a degree of esterification of about 15% or less.

4. The heterogeneous gel composition according to claim 1, containing at least one member selected from a calcium ion and a magnesium ion as a divalent metal ion.

5. The heterogeneous gel composition according to claim 1, wherein the negatively-charged gelling agent is heat resistant.

6. The heterogeneous gel composition according to claim 1, wherein the negatively-charged gelling agent is at least one member selected from gellan gum, alginic acid, alginate, alginic ester, carrageenan and pectin.

7. The heterogeneous gel composition according to claim 1, containing at least 0.03 wt. % of the pectin and 0.1 to 40 mM of the divalent metal ion.

8. The heterogeneous gel composition according to claim 1, containing of 0.005 to 5 wt. % of the negatively-charged gelling agent.

9. The heterogeneous gel composition according to claim 1, further containing at least one member selected from xanthan gum, glucomannan and galactomannan.

10. The heterogeneous gel composition according to claim 1, further containing at least one member of a protein and an acid.

11. The heterogeneous gel composition according to claim 10, containing 0.1 to 10 wt. % of the protein.

12. The heterogeneous gel composition according to claim 1, which is prepared to have a pH value of 2.5 to 5 by adding edible acid to the composition.

13. The heterogeneous gel composition according to claim 1, which is prepared using a method comprising a step of dissolving in water a powdery mixture of the pectin, the negatively-charged gelling agent, and, as required, a divalent metal ion-containing substance in powder form; adding to and dissolving in the resulting solution the divalent metal ion or a divalent metal ion-containing substance in solution form; and solidifying the mixture.

14. A method for preparing the heterogeneous gel composition of claim 1, comprising the steps of:
dissolving in water a powdery mixture of the pectin and the negatively-charged gelling agent under heating to produce a solution;
adding to and dissolving in said solution a solution containing the divalent metal ion; and
cooling down the mixture until the mixture solidifies to produce the heterogeneous gel composition.

15. A food product consisting of entirely or partly of the heterogeneous gel composition of claim 1.

16. The food product according to claim 15, which is artificial fruit flesh.

17. The food product according to claim 15, which is a confection or a beverage.

18. The food product according to claim 15, wherein the confection is jelly.

19. The food product according to claim 15, which is a food for a dysphagia patient.

* * * * *